United States Patent [19]

Enabnit

[11] 3,872,424

[45] Mar. 18, 1975

[54] APPARATUS AND METHOD FOR TRANSMITTING AUXILIARY SIGNALS ON EXISTING VEHICLE WIRING

[75] Inventor: Robert S. Enabnit, Akron, Ohio

[73] Assignee: The Goodyear Tire & Rubber Company, Akron, Ohio

[22] Filed: Oct. 12, 1973

[21] Appl. No.: 406,076

[52] U.S. Cl. .................................. 340/52 F, 340/58

[51] Int. Cl. ............................................ G08c 15/12

[58] Field of Search .......... 340/52 R, 52 F, 53, 181, 340/182, 201 R, 58; 180/103

[56] References Cited

UNITED STATES PATENTS

| | | | |
|---|---|---|---|
| 3,651,454 | 3/1972 | Venema et al. | 340/52 F |
| 3,796,990 | 3/1974 | Hill | 340/58 |

*Primary Examiner*—Alvin H. Waring
*Attorney, Agent, or Firm*—F. W. Brunner; L. A. Germain

[57] ABSTRACT

In a vehicle electrical system including a plurality of electrical circuits, short duration power pulses of insufficient average energy to light vehicle lamps are transmitted via wiring for one of the existing circuits to an accumulating circuit that provides a continual source voltage for a remote condition-monitoring circuit. A gating circuit couples the pulses transmitted via the first existing circuit to a second one of the existing circuits in response to the output of the remote condition-monitoring circuit for return to a condition-warning indicator. The return pulses are detected and a signal fed to the warning indicator that is indicative of the presence or absence of pulses. The presence of pulses provides a "condition-normal" indication whereas the absence of pulses initiates a "condition-abnormal" or warning indication.

16 Claims, 1 Drawing Figure

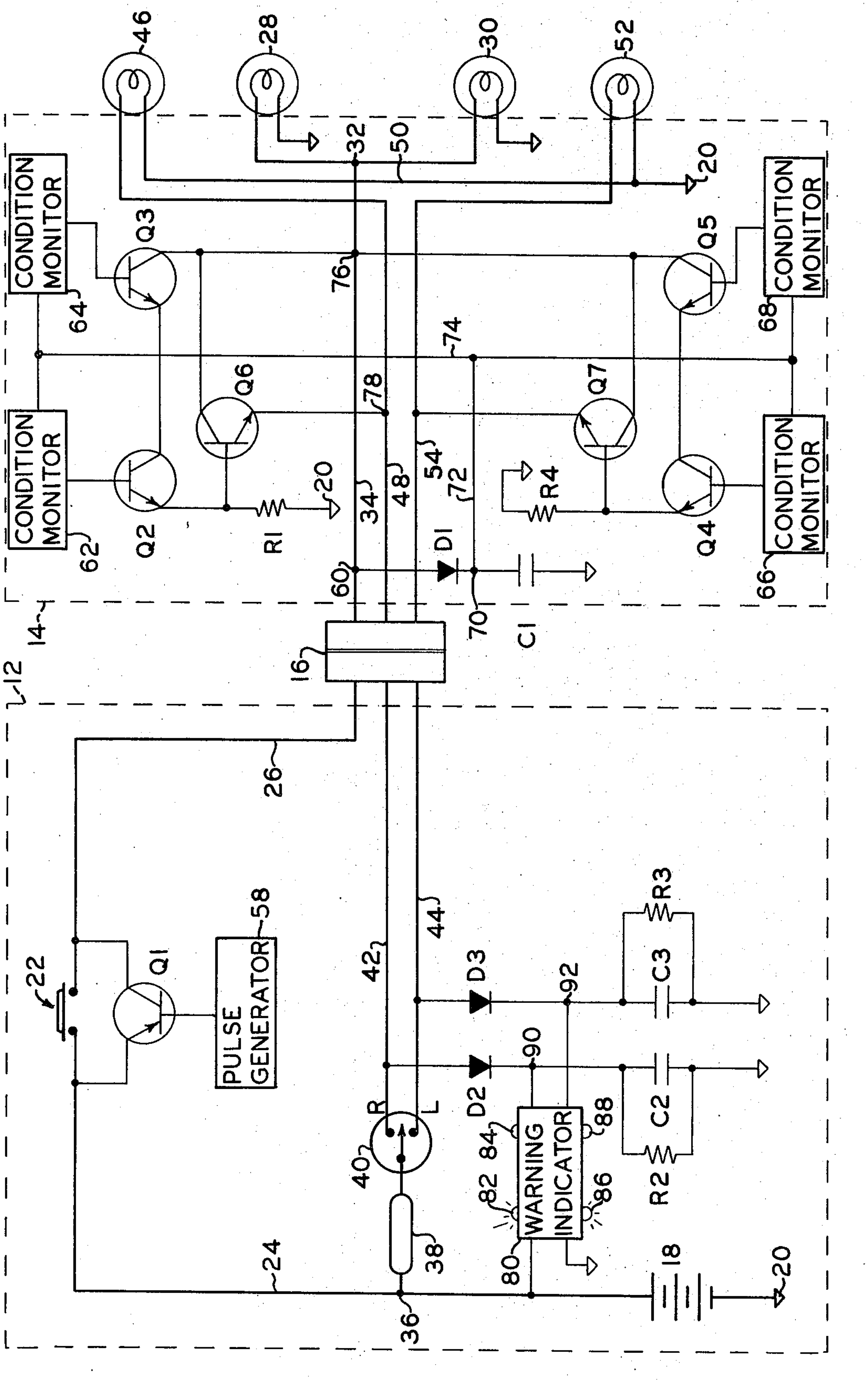
CONDITION MONITOR
CONDITION MONITOR
CONDITION MONITOR
CONDITION MONITOR
PULSE GENERATOR
WARNING INDICATOR

APPARATUS AND METHOD FOR TRANSMITTING AUXILIARY SIGNALS ON EXISTING VEHICLE WIRING

BACKGROUND OF THE INVENTION

This invention generally relates to electrical signaling systems and more specifically to vehicle electrical systems wherein the existing wiring is utilized for the transmission of signals required in the operation of auxiliary equipment.

In recent years the number of auxiliary electrical devices marketed for vehicle use has dramatically increased. Among these devices are apparatus for monitoring all phases of vehicle operation including tire pressure. Past practice has been to design self-contained systems that may be installed on or adapted to any type vehicle and marketed as optional equipment. The system package therefor included the necessary functioning components as well as wiring for installation. In the application of these devices to trucks and in particular to tractor/trailer fleets, acceptance of the equipment was impeded because electrical equipment provided one of the largest continual maintenance problems. Furthermore, wiring for auxiliary devices posed some practical problems, such as (1) the long cable runs from the tractor cab to the trailer are costly, (2) the standard connectors lack the required additional capacity, and (3) it further complicated the tractor/trailer interconnection which exhibited an already high maintenance.

SUMMARY OF THE INVENTION

It is thus a primary object of this invention to simplify and reduce the costs of installing auxiliary vehicle equipment or devices by providing a method and apparatus for transmitting auxiliary electrical signals on existing vehicle wiring.

This object and other objects and advantages which will become more evident from the detailed description that follows, are provided in apparatus in combination with a vehicle electrical system including a plurality of existing individual circuits wherein signal power and information are communicated between a remote condition-monitoring circuit and a warning indicator using the existing circuit wiring and comprising (a) a pulse generator coupled to a first one of the existing circuits to provide a source of short duration voltage pulses of insufficient average power to affect normal operation of the existing circuits; (b) circuit means coupling the remote monitoring circuit to the first circuit supplying pulses from the pulse generator to accumulate the pulses and provide a continual source of power to the monitoring circuit; (c) a gating circuit intercoupling the remote monitor and first circuits to a second of the existing circuits to gate pulses to the second circuit in response to the output of the monitoring circuit; and (d) circuit means coupling the warning indicator to the second of the existing circuits to detect the presence of pulses and provide an input signal to the warning indicator that is indicative of the monitored condition as reflected in the presence or absence of pulses returned by the second existing circuit.

DESCRIPTION OF THE DRAWING

The features and advantages of the invention will be better understood from a consideration of the following description taken in conjunction with the accompanying drawing in which the FIGURE illustrates in part schematic and part block diagram form, the application of the invention to a tractor/trailer combination.

DETAILED DESCRIPTION OF THE INVENTION

The invention is illustrated in the drawing as it may apply to a motor vehicle and more specifically as it is adapted for use on a truck tractor/trailer combination. For the purpose of simplifying the drawing and the description, the invention is shown and described with respect to the brake and turn-signal circuits only. Its application to any vehicle electrical system and other existing electrical circuits as may be available will become apparent to persons skilled and knowledgeable in the art and the invention is, therefore, considered limited only by the scope of appended claims.

In the drawing, a tractor cab electrical system is shown as including the circuitry within the dashed lines 12 while the trailer electrical system includes the circuitry within the dashed lines 14. Coupling the tractor electrical system to the trailer electrical system is a conventional interconnecting plug 16. The existing brake and turn signal circuits are shown in heavy black lines while the additional circuits used to accomplish the purpose of the invention are shown in lighter lines. Typically, the existing electrical circuits include a battery 18 grounded to the vehicle chassis at 20. The positive side of the battery is connected to one side of a brake switch 22 via wiring 24. The other side of the brake switch is connected to the interconnecting plug 16 via wiring 26.

The brake circuit is completed on the trailer 14 through brake lamps 28 and 30 connected in parallel at node 32 via the line 34 from the interconnecting plug 16. The brake lamps are connected to vehicle ground 20 such that depression of the brake switch 22 in the conventional manner completes the electrical circuit and illuminates the lamps.

Also connected to the positive terminal of the battery at node 36 is a conventional turn-signal blinking device 38 and turn-signal switch 40. The right turn-signal circuit is designated "R" and is connected to the plug 16 via line 42 while the left turn-signal circuit is designated "L" and is connected to the plug 16 via line 44. Since similarity exists between both front and rear turn-signal circuits, the description will only be concerned with the rear turn-signal circuits on the trailer. To proceed, a right turn-signal lamp 46 has its high side connected to the tractor circuit via line 48 and plug 16 while its low side completes the circuit to ground 20 via line 50. In the same manner, a left turn lamp 52 has its high side connected to the tractor circuit via line 54 and plug 16 while its low side completes the circuit to ground 20 via line 50. Either right or left turn-signal circuits are activated by the closing of the turn-signal switch 40 in the well known and conventional manner.

The principal deterrent to carrying auxiliary equipment signals on these existing circuits is that normal termination loads are always present as potential power drains even when not intentionally activated. Continuous level signals could not be transmitted to or from auxiliary sensors using these lines without abnormally activating regular terminal devices such as right turn, left turn, and brake lamps, or wasting large amounts of power in reducing the level to a sub-active magnitude. Practical circumvention of these problems using existing circuit wiring can be provided by transmitting both remote source power and return signals from the sensors as short periodic high level pulses, the average power of which is well below that required for normal operation of the circuit terminal devices. For the purpose of this description, the invention will be described with respect to low tire pressure warning systems as described in applicant's prior U.S. Pat. No. 3,665,387 issued May 23, 1972, and U.S. Pat. No. 3,831,161 issued Aug. 20, 1974. The inventions as described in the before-mentioned patents operate on the basis that under normal operating conditions, a closed sensor circuit on the vehicle wheel effects a pulsed signal in a condition monitoring circuit on the vehicle chassis each and every revolution of the wheel. The pulses are accumulated in the monitoring circuit to provide a DC voltage level to a pressure warning indicator circuit that maintains an OK condition indication. Upon the absence of pulses due to an abnormal pressure condition on the wheel, the accumulation of pulses is no longer maintained and a warning signal is presented by the warning indicator. In the application of the present invention to a truck including the above-mentioned low tire-pressure warning devices, a means must be provided for supplying continual power to the monitoring circuits. In the drawing, the power supply for these circuits is provided by a pulse generator 58 connected to the brake circuit through a gating transistor Q1. The pulse generator supplies pulses to the brake circuit and adjusts the pulse width and rate such that the average pulse power is below the illumination level of the existing circuit terminal devices. Since the brake lamps may be powered only during the pulse duration, the average power is well below that required for their operation and the lamps remain non-illuminated.

Connected to the trailer brake line 34 at node 60 is a diode D1 and capacitor C1. The capacitor C1 charges rapidly during high forward conduction of the series diode D1 during each pulse appearing on the brake line 34. During pulse intervals, the low inverse conduction of the diode prevents the charge on the capacitor from being dissipated back into the brake circuit. The voltage level across C1 is applied as a source voltage to condition monitoring circuits 62, 64, 66, and 68 via connection at node 70 and lines 72 and 74.

Return signals to the tractor cab for signifying the status of the monitoring circuits as described in the beforementioned patents are accomplished using the same power pulses. These pulse are carried via the right and left turn-signal circuits for the respective sides of the vehicle as will be more fully explained hereinafter. Since several wheel positions are generally involved to a side of the vehicle, logic is required to provide a single signal denoting the health of the group. Each wheel monitoring circuit 62–68 signifies normal conditions via a positive output voltage level; abnormal conditions via the absence or drop in the voltage level. Using these voltages to sustain individual conduction and therefore continuity in a series string of transistor drivers Q2 and Q3 provides the common logic for the right side monitoring circuits while a series string of transistor drivers Q4 and Q5 provide the common logic for the left side monitoring circuits. Although two such transistor drivers are shown in the drawing for each side of the vehicle, one will suffice and more may be added depending upon the number of monitoring circuits used. Subsequent line driving transistors Q6 and Q7 are then used to gate the pulses appearing in the brake circuit on line 34 to a respective turn signal circuits via lines 48 and 54.

As shown in the drawing for the right side monitoring circuits 62 and 64, the series transistor drivers Q2 and Q3 are connected between the brake circuit at node 76 and ground 20 through resistor R1. Responsive to the conduction of these transistors as reflected in the base voltages from the respective monitoring circuits is the line driving transistor Q6 connected between the brake circuit at node 76 and the right turn-signal circuit at node 78 with its base electrode connected to the emitter of Q2. In this configuration and under normal operating conditions, the transistors Q2, Q3, and Q6 are conducting and pulses appearing in the brake circuit on line 34 are gated to the right turn-signal circuit on line 48. When either transistor Q2 or Q3 is switched into non-conduction by virtue of a drop in base voltage that reflects an abnormal condition occurrence on the vehicle wheel as detected by the monitoring circuit, then the line driving transistor is also switched into non-conduction and no pulses are gated to the turn signal line 48.

The left side gating circuit is the same as that just described for the right side except that the pulses from the brake circuit are gated through the line driving transistor Q7 to the left turn signal line 54. Similarly, the series drivers Q4 and Q5 are maintained conductive by the output of their respective condition monitoring circuits 66 and 68.

In the situation just described, if any one of the monitoring circuits 62–68 fails to provide a positive bias level to its respective transistor driver Q2–Q5, the corresponding line driving output transistor Q6 or Q7 becomes non-conductive and pulses are not gated to the respective right or left turn-signal lines 48 and 54. Since pulses can only be present on the turn signal lines 48 and 54 if all situations are normal, it is only necessary to ascertain their continued presence at the tractor cab to provide a fail-safe indication of the monitored condition, i.e., normal tire pressure. With reference to the low tire pressure warning systems as described in the cited patents, a storage time constant at the input of the warning indicator 80 in the tractor cab 12 is required to store return signal pulses from the turn signal lines 48, 54 and provide a sustained voltage level for maintaining a "condition-normal" status indication at the warning indicator. As shown in the drawing, a diode D2 and an RC circuit comprising capacitor C2 and resistor R2 are connected to the right turn-signal line 42. The capacitor C2 charges during the high forward conduction of the diode D2 during each pulse appearing on the turn-signal line 42 via line 48 and plug 16, and the voltage level is sustained on the capacitor by reason of the low inverse conduction of the series diode. In this circumstance, the input to the warning indicator provided at node 90 is a sustained voltage that maintains the warning indicator 80 in a "condition-normal" indication as reflected in the illuminated lamp 82. In an abnormal condition occurrence, in other words, absence of pulses on line 42, the voltage across the capacitor C2 decays to zero through resistor R2 and the warning indicator switches to a "condition-abnormal" indication as reflected in illumination of lamp 84.

In the same manner, pulses appearing on the left turn-signal line 44 via line 54 and plug 16, charge a capacitor C3 through a series diode D3 to sustain a voltage level at node 92 such that a "condition-normal" indication is maintained in the warning indicator 80 and lamp 86 is illuminated. The absence of pulses on line 44 causes the voltage across C3 to discharge through resistor R3 and the warning indicator switches to a "condition-abnormal" indication that is reflected in the illumination of lamp 88.

It should be apparent from the foregoing description that the pulses being transmitted on the existing circuits will have some effect on these circuits. The effect, however, is a beneficial one in that the average power in the pulses, although too low for illumination of the circuit lamps, is sufficient to maintain the lamp filaments slightly heated. In this circumstance, the filament structure is much less brittle and more capable of withstanding vibration and thermal shock. According to tungsten lamp manufacturers, such warming in the non-illuminated state adds substantially to the overall lamp life in shock and vibration environments while contributing negligible loss to illuminating life. This feature of the invention may be extended to all the lamps on a vehicle by using the main light circuit lines rather than just the brake light circuit lines as the prime carrier of the power pulses. In the application to a truck tractor/-trailer combination where many running lights are involved, the reduction in lamp maintenance may be substantial.

While certain representative embodiments and details have been shown for the purpose of illustrating the invention, it will be apparent to those skilled in the art that various changes and modifications may be made therein without departing from the spirit or scope of the invention.

What is claimed is:

1. In combination with a vehicle electrical system including a plurality of *n* individual circuits, apparatus to effect power and information communication between a remote condition monitoring circuit and a warning indicator using the circuit wiring for the *n* individual circuits comprising:

a. a pulse generator coupled to a first of the *n* individual circuits to provide short duration voltage pulses of insufficient average power to affect normal circuit operation;

b. circuit means coupling the remote condition monitoring circuit to the first of the *n* circuits to accumulate the pulses and provide a continual source of DC power to the monitoring circuit;

c. a gating circuit intercoupling the remote monitoring circuit, the first of the *n* circuits, and a second of the *n* circuits, to gate pulses from the first of the *n* circuits to the second of the *n* circuits in response to the output of the remote monitoring circuit; and d. circuit means coupling the warning indicator to the second of the *n* circuits to detect the presence of pulses and provide an input signal to the warning indicator indicative of the monitored condition as reflected in the presence or absence of pulses.

2. The apparatus according to claim 1, wherein the first of the *n* circuits is a vehicle brake-signal circuit and the second of the *n* circuits is a vehicle turn-signal circuit.

3. The apparatus according to claim 1, wherein the first of the *n* circuits is a vehicle light circuit and the second of the *n* circuits is a vehicle turn-signal circuit.

4. The apparatus according to claim 1, wherein the circuit means coupling the remote condition monitoring circuit to the first of the *n* circuits comprises a series diode and storage capacitor, said capacitor charging rapidly during forward conduction of the diode in the presence of a pulse and the low inverse-conduction of the diode preventing charge dissipation back into the circuit such that a constant voltage is sustained across the capacitor during the pulse interval.

5. The apparatus according to claim 1, wherein the gating circuit comprises:

a. a transistor driver having base, emitter, and collector electrodes, the base connected to the output of the condition monitoring circuit, the emitter connected to vehicle ground through a resitance, and the collector connected to the first of *n* circuits;

and b. an output transistor having base, emitter, and collector electrodes, the base connected to the emitter of the driver transistor, the emitter connected to the second of *n* circuit, and the collector connected to the first of *n* circuit; said driver transistor switched into conduction by an appropriate voltage from the condition monitoring circuit such that the output transistor is switched into conduction by the voltage appearing across the emitter resistor of the transistor driver and pulses are gated to the second of *n* circuit.

6. The apparatus according to claim 5, wherein a normal monitored condition maintains the gating circuit conductive while an abnormal monitored condition switches the gating circuit to its non-conductive state such that pulses are no longer gated to the second of *n* circuit.

7. The apparatus according to claim 6, wherein a plurality of monitoring circuits are provided each having a transistor driver associated therewith, said transistor drivers connected in series such that a drop in base voltage at any one driver due to an abnormal condition occurrence sensed by its respective condition monitoring circuit renders all of said drivers non-conductive.

8. The apparatus according to claim 1, wherein the circuit means coupling the warning indicator to the second of *n* circuit comprises an RC circuit connected through a series diode such that the presence of pulses in the second of *n* circuit charges the capacitor through the diode and the absence of pulses discharges the capacitor through the resistor.

9. In combination with a vehicle electrical system including a source of DC power, a brake-signal circuit, a turn-signal circuit, a tire pressure monitoring circuit, and a condition warning indicator, apparatus to effect communicating power signals to and information signals from the monitoring circuit to the warning indicator using the existing brake and turn-signal circuits comprising:

A. a pulse generator connected in the brake circuit to provide short duration voltage pulses, said pulses having insufficient average power to affect normal operation of the existing circuits;

B. first circuit means coupling the tire pressure monitoring circuit to the brake circuit to accumulate the pulses and provide a continual source of power to the monitoring circuit;

C. gating circuit means intercoupling the pressure monitor, brake, and turn-signal circuits to gate pulses from the brake circuit to the turn-signal circuit in response to the output of the pressure monitoring circuit;

and

D. second circuit means coupling the warning indicator to the turn-signal circuit and responsive to the presence and absence of pulses to provide a signal input to the warning indicator representative of the monitored condition as reflected in presence or absence of pulses.

10. The apparatus of claim 9, wherein normal tire pressure affects the pressure monitoring circuit in a manner to effect gating of the pulses from the brake circuit to the turn-signal circuit while an abnormal pressure effects switching of the gating circuit to a nonconductive state such that pulses are not gated to the turn-signal circuit.

11. The apparatus of claim 9, wherein the second circuit means is an RC circuit coupled through a series diode such that the capacitor is charged in the pulse duration and discharged across the circuit resistor in the absence of a pulse, said warning indicator providing a safe indication as long as the capacitor is periodically charged by the presence of pulses but switched to an unsafe warning indication when the capacitor completely discharges due to the absence of pulses.

12. The apparatus of claim 11, wherein a plurality of pressure monitoring circuits are provided to monitor the pressure condition of a plurality of vehicle tires, said monitoring circuits receiving power from the first circuit means and the gating circuit comprises:

a. an equal plurality of transistor drivers having base, emitter, and collector electrodes, each of said drivers coupled and responsive to a respective monitoring circuit, the plurality of drivers connected in series such that the conductive state of one affects the conductive state of the rest and the first of said series connected transistors has its emitter connected to vehicle ground through a resistance while the last of said series transistors has its collector connected to the brake circuit; and b. an output transistor having base, emitter, and collector electrodes, the base connected to the emitter of said bottom transistor driver, the collector connected to brake circuit, and the emitter connected to the turn-signal circuit, said output transistor responsive to the emitter voltage of the bottom transistor driver as determined by the conductive state of the series drivers such that switching into nonconduction effectively blocks pulse gating from the brake circuit to the turn-signal circuit.

13. The apparatus of claim 12, wherein the vehicle electrical system includes right and left turn-signal circuits and the monitoring circuits are split into right and left tire pressure monitoring circuits with gating circuits associated therewith such that pulses are gated from the brake circuit to the right turn-signal circuit in response to the right tire pressure monitoring circuits while pulses are gated to the left turn-signal circuit in response to the left tire pressure monitoring circuits and a second circuit means is associated with each right and left turn-signal circuit to provide input signals to the warning indicator representative of the pressure conditions existing on either right or left sides of the vehicle.

14. In a vehicle electrical system of *n* existing circuits, the method of communicating power to and information signals from a remote condition monitoring circuit to a warning indicator using the existing *n* circuits comprising the steps of:

A. generating pulses of insufficient average power to affect the normal operation of the existing *n* circuits;

B. transmitting the pulses on a first of the *n* circuits to the remote condition monitoring circuit;

C. accumulating the pulses at the condition monitoring circuit to provide a continual source of power to the circuit;

D. gating the pulses from the first of the *n* circuits to a second of the *n* circuits in response to the condition monitored by the monitoring circuit;

and

E. utilizing the gated pulses on the second of the *n* circuits to provide a voltage signal to the warning indicator indicative of the monitored condition.

15. The method of claim 14, wherein the first of the *n* circuits is a vehicle brake-signal circuit and the second of the *n* circuits is a vehicle turn-signal circuit and the pulses are gated only in response to a normal monitored condition, the pulses being blocked for an abnormal condition occurrence with a resultant warning signal being developed in the warning indicator due to the absence of pulses in the turn-signal circuit.

16. The method of claim 14, wherein the condition monitored is a vehicle tire pressure and the pulses are maintained when the tire pressure is normal while an abnormal drop in pressure is reflected in the absence of pulses.

* * * * *